March 25, 1958     R. C. MOTT     2,828,077
PNEUMATIC THERMOSTAT Filed June 29, 1955     5 Sheets-Sheet 1

INVENTOR.
RICHARD C. MOTT
BY Joseph E. Ryan
ATTORNEY

March 25, 1958 R. C. MOTT 2,828,077
PNEUMATIC THERMOSTAT
Filed June 29, 1955 5 Sheets-Sheet 2

INVENTOR.
RICHARD C. MOTT
BY
Joseph E. Ryan
ATTORNEY

March 25, 1958 R. C. MOTT 2,828,077
PNEUMATIC THERMOSTAT
Filed June 29, 1955 5 Sheets-Sheet 3

INVENTOR.
RICHARD C. MOTT
BY
Joseph E. Ryan
ATTORNEY

March 25, 1958   R. C. MOTT   2,828,077
PNEUMATIC THERMOSTAT
Filed June 29, 1955   5 Sheets-Sheet 4

FIG.9

INVENTOR.
RICHARD C. MOTT
BY
Joseph E. Ryan
ATTORNEY

March 25, 1958 R. C. MOTT 2,828,077
PNEUMATIC THERMOSTAT
Filed June 29, 1955 5 Sheets-Sheet 5

INVENTOR.
RICHARD C. MOTT
BY Joseph E. Ryan
ATTORNEY

United States Patent Office 2,828,077
Patented Mar. 25, 1958

2,828,077

PNEUMATIC THERMOSTAT

Richard C. Mott, Chicago, Ill., assignor to Minneapolis-Honeywell Regulator Company, Minneapolis, Minn., a corporation of Delaware Application June 29, 1955, Serial No. 518,856

16 Claims. (Cl. 236—82)

This invention relates to pneumatic type of thermostats and more particularly to an improved pneumatic thermostat.

One of the objects of this invention is to provide an improved pneumatic thermostat of the bleed type which incorporates a compact sensing element, a force feedback arrangement, a set point adjustment mechanism, and an auxiliary set point adjustment mechanism designed for remote control in a compact and simplified design.

Another object of this invention is to provide a pneumatic round thermostat design.

A further object of this invention is to provide in an improved pneumatic thermostat an arrangement by which the ratio of the force feedback may be readily adjusted and in which the authority of the remote set point adjustment mechanism may be readily adjusted.

A still further object of this invention is to provide an improved pneumatic thermostat design in which set point adjustment may be readily made without removing the cover of the thermostat and without requiring any special tools for such adjustment.

Still another object of this invention is to provide in an improved pneumatic thermostat a novel nozzle construction which is simple in construction and easy to maintain.

A still further object of this invention is to provide in a pneumatic thermostat a simplified arrangement for checking air pressures at the thermostat without requiring any disassembly of the thermostat.

Further objects of this invention will become apparent from a reading of the attached description together with the drawings, wherein.

Figure 1:
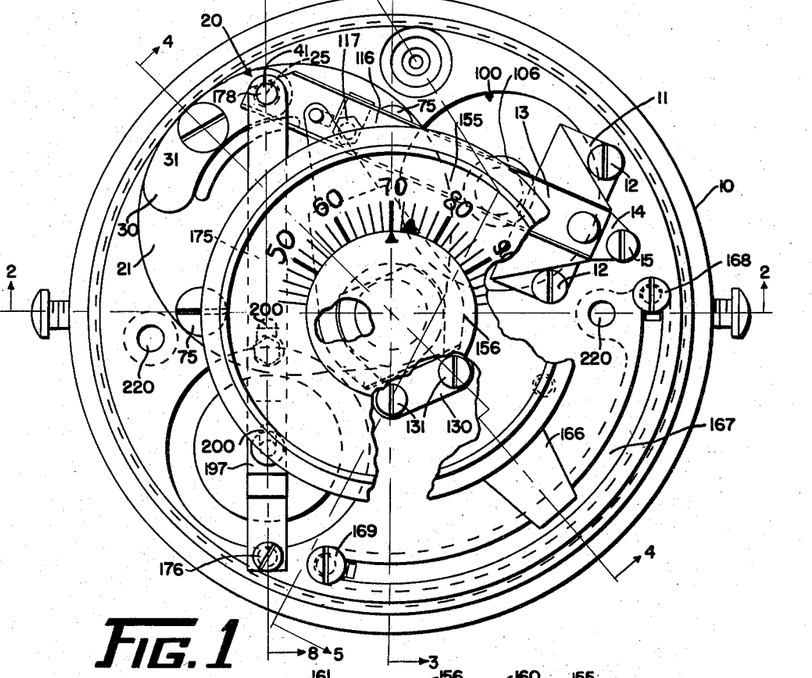
Figure 1 is a plan view of the thermostat with the cover removed.
Figure 7:
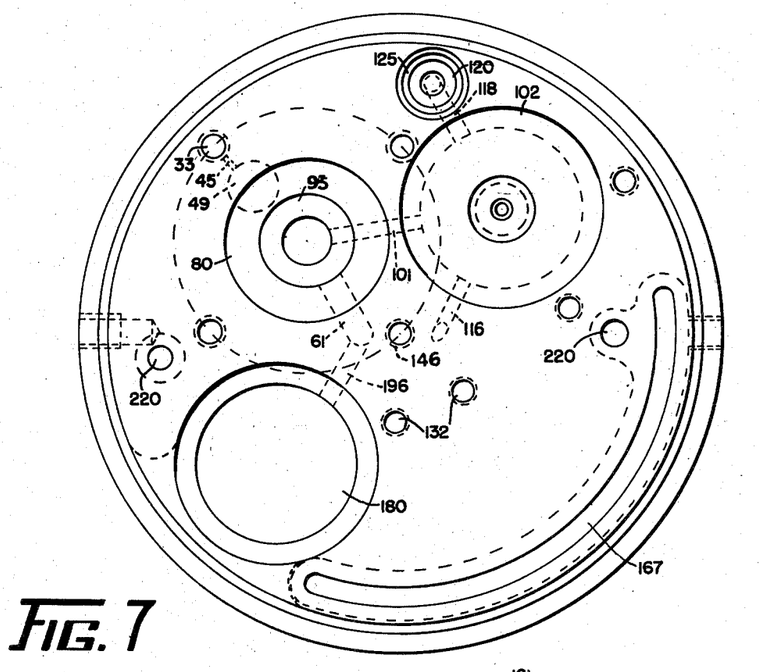
Figure 7 is a plane view of the base casting of the thermostat to indicate a passage therein.

This improved pneumatic thermostat is small and compact in design and is shown in the drawings in double scale for clarification purposes. It incorporates conventional sensing, a bleed type nozzle and associated pneumatic relay together with a force follow-up mechanism and an auxiliary pressure responsive remote controller together with a set point adjusting mechanism all mounted on a composite base which is a rounded configuration. These elements are shown schematically in Figure 10. As best seen in Figures 1 and 7, the thermostat element includes a base member indicated at 10 which is a rounded configuration and has a plurality of recesses and passages therein which will be later identified, the base member being cast or otherwise suitably formed. Mounted on the upper surface of the base member is the thermal sensing element or bimetal indicated at 11 which is U-shaped in form and has one extremity secured to the upper surface of the base 10 through screws 12 and mounts at its other extremity an armature member indicated at 13 which is shown as generally channel shaped in form. The armature 13 is suitably attached to the bimetal such as by riveting or spot welding. The portion of the curved bimetal attached to the member 10 also includes a tongue indicated at 14 with an adjusting screw 15 therethrough designed to position the bimetal and hence the armature attached thereto in a predetermined relationship with respect to the base for purposes to be later identified.

Figure 9:
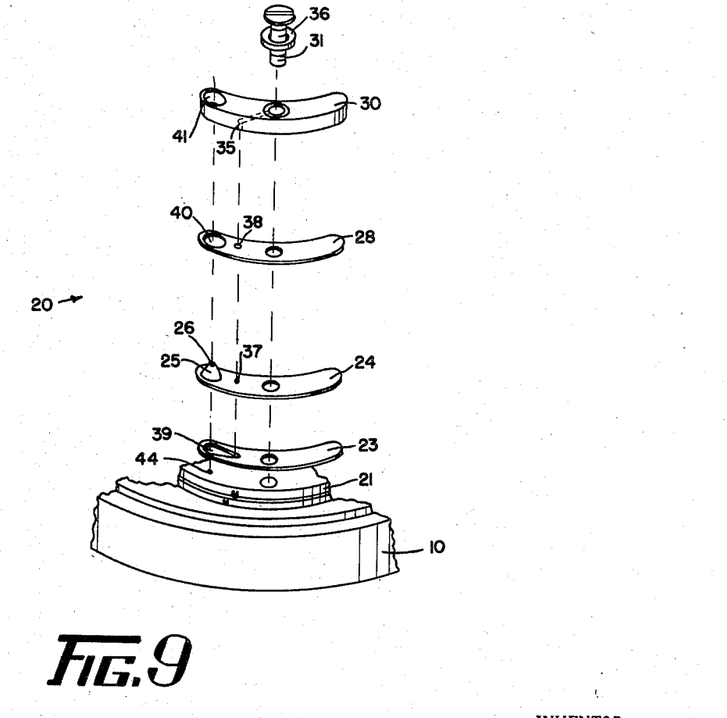
Figure 9 is exploded view of the nozzle parts of the thermostat.
Figure 13:
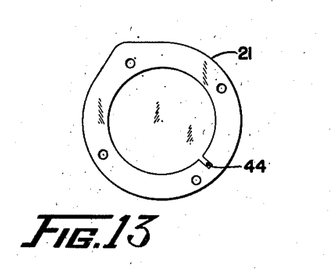
Figure 13 is a bottom view of a plate on the upper surface of the base showing an air passage therein.

Cooperating with the armature 13 is a bleed type nozzle for the thermostat shown generally at 20 in Figure 1 and in detail in Figure 9. Nozzle 20 is mounted on top of a plate 21 which secures the relay mechanism within the base 10 and which will be later identified in detail. As will be seen in Figure 9, the nozzle assembly is comprised of the gasket member 23 having a pair of apertures therein. A nozzle plate 24 having a raised portion 25 with an aperture 26 therein, a second gasket 28 and a cover plate 30. The nozzle assembly parts are held in position by means of the screw 31 which fits through a series of apertures in the aforementioned parts of the assembly and through an aperture in the plate 21 being tapped into a hole or aperture in the base 10 and indicated at 33 in Figure 7. The apertures through which the screw 31 is positioned are slightly oversized such that the air supply may be fed along the surface of the screw and between the screw and the parts of the nozzle assembly up to plate 30 where a passageway 35 is drilled into the plate from the aperture in which the screw is located feeding to the underside of the plate 30. An insulated bushing member or washer 36 is positioned around the head of the screw to seal the air passage formed between the screw and the nozzle assembly at this upper extremity. Air pressure or control air is fed from the passage 35 through an aperture indicated at 38 in gasket 28 and through a restriction 37 in plate 24 to the aperture 39 in the gasket 23. It will be seen therefore that the control air will be fed from the passage along the screw through passageways and the restriction 37 in the plate 24 of the nozzle to the underside of the nozzle surface and the aperture 39 wherein the control air will be fed to the nozzle 26 in the projection 25 of the plate 24. Apertures 40 and 41 in the gasket 28 and plate 30 permit the projection 25 of the nozzle plate to project therethrough and in proximity with the armature to form the desired control of the air flowing from the nozzle. Also included in plate 21 is an aperture indicated at 44 leading to the relay positioned below the plate 21 as will be seen in the bottom view thereof in Figure 13.

Figure 4:
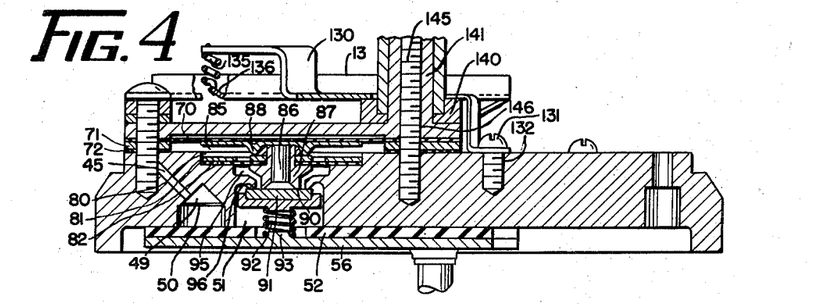
Figure 4 is a sectional view of the thermostat shown in Figure 1 taken along the lines 4—4.
Figure 11:
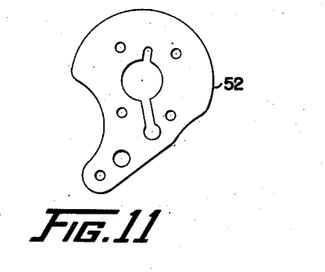
Figure 11 is a plan view of a gasket on the bottom surface of the base showing air passages therein.

Connected to the tapped hole 33 in the base into which the screw 31 of the nozzle assembly is threaded is a passageway 45 which will best be seen in Figure 4. This passageway leads to a filtered chamber 49 with a filter 50 therein which in turn is connected to a relay aperture indicated at 51 and through a passage in the gasket 52 (see Figure 11) sealing the chambers 49 and 51 to the inlet air tube of the thermostat indicated at 55 in Figure 2. The gasket 52 sealing these passages is held in place by a plate 56 to which the inlet passage 55 and an outlet passage 57 are connected, the plate 56 being suitably secured to the bottom side of the base member 10 by screws indicated at 60 and best seen in Figure 2. Thus inlet air or main air directed from the inlet 55 is directed through an aperture 61 in the base to the chamber 51 of the relay and through a slot in the gasket 52 (see Figure 11) through the chamber 49 wherein the air is filtered and then passing through the passage 45 along the screw 31 to the nozzle assembly 20 where it is valved by the end of the armature 13 operated by the bimetal 11.

Figure 12:
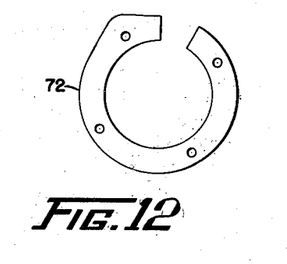
Figure 12 is a plan view of a gasket on the upper surface of the base showing an air passage therethrough.

The pressure change brought about by the cooperation of the armature 13 with the nozzle assembly 20 is reflected through the aperture indicated at 44 in the plate 21 to one side of a first diaphragm indicated at 70 in Figure 4 of the relay assembly. Positioned beneath the diaphragm 70 is a spacer plate 71 and a gasket 72 which parts are secured together with the plate 21 and to the base by a plurality of screws, best seen in Figure 1, and indicated at 75, together with the screw 31 of the nozzle assembly. Positioned within a recess 80 formed in the base 10 is a second diaphragm 82 of the relay assembly, best seen in Figure 4, which diaphragm is held in position within the base 10 by means of a ring indicated at 81. The diaphragm 82 and the diaphragm 70 form a second chamber 85 of the relay which is vented to the atmosphere by means of a slot in the gasket 72 (see Figure 12). Attached to the diaphragm 82 is a valve plug 87 having a passage or port therethrough 86 which plug and port cooperates with a plate 88 attached to the diaphragm 70 of the relay to close off the passage 86 entering the second chamber indicated at 85 and formed by the diaphragm 70 and 82. Positioned below the diaphragm 82, the valve plug 87 has an annular shoulder portion 90 against which a valve plug 91 is positioned, the plug being biased by a spring 92 which is positioned between the plug and the base plate 56 and is held in position by a hub 93 on the plate 56. The portion of the recess surrounding the shoulder portion 90 is identified as a branch line chamber 95 of the relay and the valve plug 87 of the diaphragm 82 acts as a valve between the chamber 95 and the passageway 86. A shoulder portion 96 in the recess 80 of base 10 is also engaged by plug 91 to valve main line air into the chamber 95 when valve plug 87 is urged downwardly to move plug 91 against spring 92 away from shoulder portion or seat 96, main line air is admitted to chamber 95 from chamber 51.

Thus, as main line pressure is brought from the inlet passage 55 of the thermostat through the passage 61 in the base to the opening 51 therein, the control air will flow through to the nozzle to be controlled by the nozzle position and reflect a pressure to the upper side of diaphragm 70 or the chamber formed between the plate 21 and the diaphragm 70. On the opposite side of this diaphragm or in the chamber 85 the pressure will be at atmospheric level and because of the engagement of plate 88 with the plug 87 and the plug 91, the force on this side of the diaphragm will be transmitted against the spring 92 to control the passage of main line air from the chamber 51 into the chamber 95 of the relay. Thus with the armature approaching or closing off the passage 26 of the nozzle, the pressure within the pilot chamber or above the diaphragm 70 acting against the spring 92 will increase causing a resultant movement of the plunger or plug 91 downward to open the relay to main line air and allowing control air pressure to exist in the chamber 95.

This control air pressure is directed to the force feedback mechanism indicated generally at 100 and to the outlet passage 57 of the thermostat in a manner to be described in detail hereinafter. With a decrease in branch line pressure as controlled by the flapper or armature 13 and nozzle assembly 20, the spring will return the plunger or plug 91 of the relay to the shoulder portion 96 closing communication of the chamber 95 with the chamber 51. Chamber 95, will, however, contain the branch line pressure or the pressure of the actuator controlled by the thermostat which if greater than the pressure on the upper side of diaphragm 70 will cause the diaphragm 82 and 70 to move upward opening the valve between the chamber 80 and chamber 95 and between the plug 85 and the plate 88 to vent the actuator pressure to atmosphere in a conventional manner.

Figure 5:
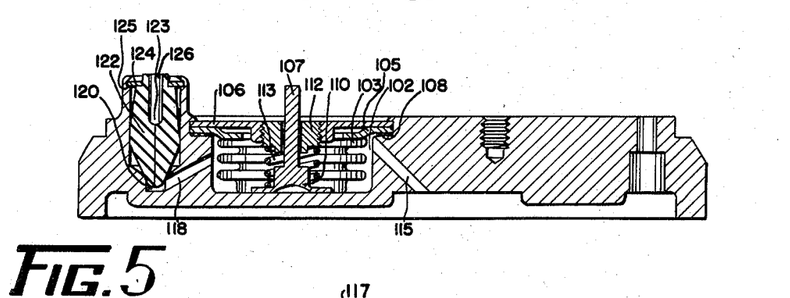
Figure 5 is a sectional view of the base of the thermostat taken along the lines 5—5 of Figure 1 with the set point adjustment mechanism removed.
Figure 6:
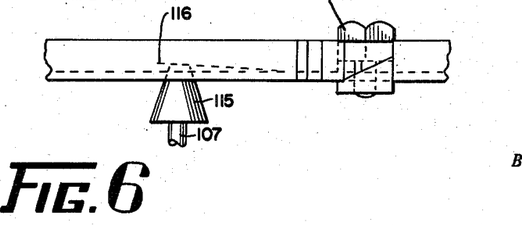
Figure 6 is a sectional view of the armature of the thermostat.

As will be seen in Figure 7, the chamber 95 of the relay is connected by a passage indicated at 101 to a recess 102 in the base housing the force feedback mechanism 100. This force feedback mechanism is best seen in Figure 5 as including a bellows 103 sealed in the recess 102 by a plate 105 on top of which is positioned a supporting and guiding plate 106 for a shaft 107 of the feedback mechanism. The plates 105 and 106 are held in position on the base 10 by suitable means such as crimping. A gasket member 108 positioned below the plate 105 and along the rim thereof, aids in sealing the chamber below the plate which is defined between the bellows 103 and the surface of the recess 102. Positioned within the bellows is the shaft 107 terminating in a flange like portion 110 which rests on the end surface of the bellows such that the shaft 107 is moved upward as the bellows collapses with increase in pressure in the force feedback chamber. Suitably connected to the guide plate 106 is a sleeve 112 with an aperture therein through which the shaft extends, the sleeve 112 acting as the actual guide for the shaft 107 and serving as an abutment against which a spring is positioned encircling the shaft, the spring being shown at 113 with its opposite extremity resting on the flange portion 110 of the shaft and biasing the bellows to an expanded position. Thus with an increase in pressure in the feedback chamber above a predetermined point determined by the restraint of the spring member 113, the shaft 107 will be urged upward. Attached to the end of the shaft 107 is a conically shaped member 115 which extends through an aperture in the armature (not shown) and into engagement with a flexible blade 116 which is adjustably attached to a slot in the armature 13 (also not shown) by means of a nut and bolt type of connection indicated at 117. By loosening the nut and sliding it within the slot in the armature, the flexible member or spring 116 may be moved relative to the conically shaped engaging member 115 of the force feedback mechanism 100 to flex the spring and vary the application of force from the feedback mechanism to the armature 13.

Figure 2:
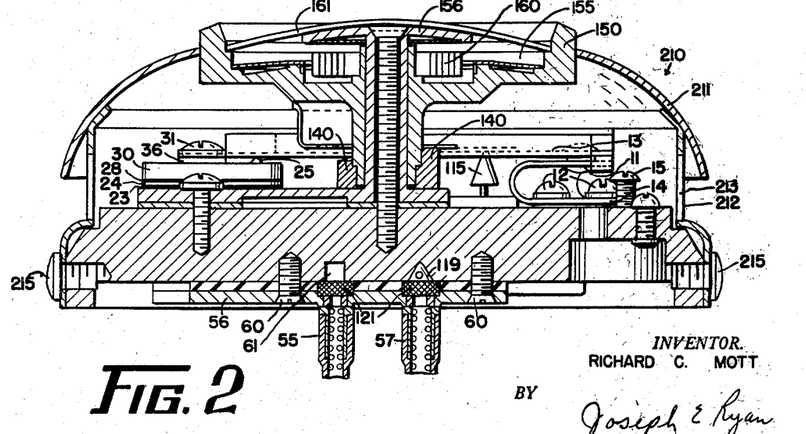
Figure 2 is a sectional view of the thermostat shown in Figure 1 along the section lines 2—2 and with the cover in place.
Figure 10:
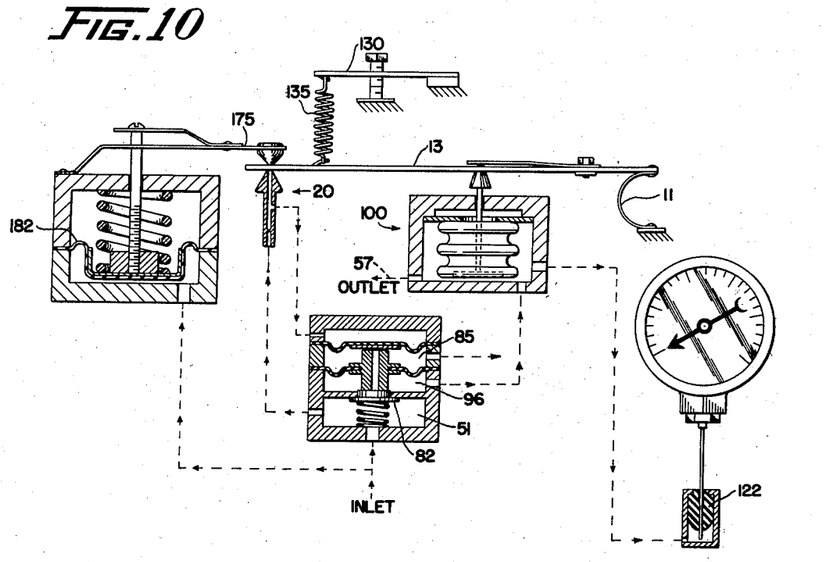
Figure 10 is a schematic view of the thermostat together with a meter check apparatus.

As indicated in Figures 5 and 7, a chamber 102 of the force feedback mechanism is connected by means of a passageway 116 into an opening 119 in the base 10 near the under surface thereof into which the outlet pipe 57 or branch line connection for a thermostat is located. As indicated in Figure 2, both the main line and branch line tubes for the thermostat are suitably connected to the plate 56 with passages therethrough termintaing in spaces in which are located filters indicated at 121. Chamber 102 is also connected (Figure 5) to a recess 120 in the base by means of a passage 118. Positioned in the recess 120 is a cylindrical rubber sealing member 122 having a centrally located passage indicated at 123 forming an inflator type valve within the chamber 120. The rubber valve member 122 is held in position in the aperture 120 by means of a plate 124 which rests in a shoulder 125 surrounding the aperture 120 with a portion of the shoulder being bent over the plate 124 to secure the same and hold the valve member within the base. The passage 123 through the valve or rubber member 122 is enlarged at its upper extremity, as at 126, to facilitate the entrance of a hollow tube to which a meter is adapted to be connected such as is shown in Figure 10. The tube may be forced through the passage 123 expanding the same to communicate with the chamber 120, which chamber also is connected to the chamber of the force feedback bellows and is common to the output connection or branch line connection 57 of the thermostat, such that branch line pressure may be checked without disassembly of any parts of the thermostat. The rubber member 122 acts as a valve in that it is deformed as the tube (not shown) is inserted through the passage 123 and returns to form sealing passage 123 whenever the tube is removed. In this manner an accessible connection is available to the output or branch line side of the thermostat for check purposes.

Figure 3:
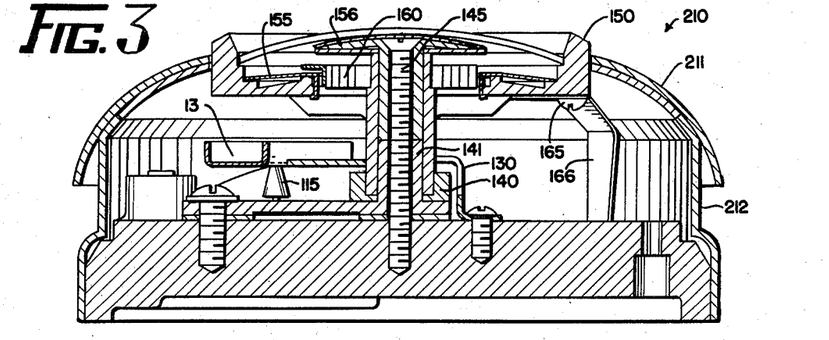
Figure 3 is a sectional view of the thermostat shown in Figure 1 taken along the lines 3—3 and with the cover in place.

A set point adjustment for the thermostat is provided by means of a pivoted lever member indicated at 130 which is connected to the base 10 by means of a screw 131 fitting into apertures 132 in the base, the lever member being flexible and carrying at its free extremity a spring 135 which is connected to the armature 13 by means of a hook-like detent 136 on the armature. This pivoted lever is adapted to vary the tension of the spring 135 and apply a force to the pivoted armature 13 to act in conjunction with the displacement of the bimetal and the force applied from the feedback mechanism 100 to vary the position of the end of the armature relative to the nozzle and control the change in control pressure for the relay previously described. As can best be seen in Figures 2, 3, and 4, the pivoted arm 130 rests on a cam like member indicated at 140 which is positioned around a hub like extension or flange 141 attached to or integral with the plate 21 forming the upper surface of the relay. A screw member 145 is threaded into an aperture 146 in the base to secure the plate 21 at this point. Surrounding the cylindrical boss portion 141 of the plate 21 and connected to the internal surface of the cam like member 140 through suitable means, such as splining, is a manual adjusting knob 150 which as indicated in Figures 2 and 3 projects through an aperture in the cover of the thermostat to be later described. The knob carries suitable indicia, indicated at 155, which is press fitted as will be seen in Figures 2 and 3 into a shoulder portion thereof and which cooperates with an index member 156 secured to the boss portion 141 attached to the plate 21 of the base. Also included in the manual adjusting knob is a temperature responsive indicating element 160 in the form of a coiled bimetal which is mounted on the knob 150 and cooperates with the indicia 155 mounted thereon. The details of this knob assembly and the temperature responsive element carried thereby are covered in a copending application of Carl G. Kronmiller, Serial Number 370,029, entitled Control Device and filed July 24, 1953. Suitable cover means 161 which is press fitted in the knob 150 encloses the indicia and thermostatic element within the manually adjusting knob. Rotation of the knob with respect to the base member causes rotation of the cam 140 and varies the position of the camming surfaces thereon relative to the arm 130 to displace the same relative to the base and vary the spring tension of the spring 135 attached to the armature 13 to adjust the set point of the thermostat. Connected to the adjusting knob 150 by suitable means such as screws 165 is an arm 166 which extends into a slotted aperture 167 in the base. Screw means indicated at 168 and 169 in this slotted aperture of the base are adjustable relative thereto to limit the rotation of the manual adjusting arm and act as stop members on the arm 166 for this purpose.

Figure 8:
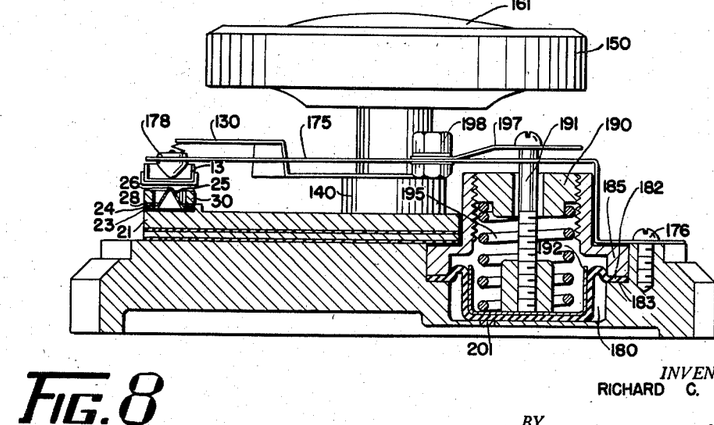
Figure 8 is a sectional view of the thermostat shown in Figure 1 taken along the lines 8—8 therein.

Also cooperating with armature 13 as indicated in Figure 8 is a second pivoted lever 175 which is pivotally attached to the base 10 by means of a screw 176. Armature or lever 175 carries a conically shaped engagement member 178 which is suitably attached to the lever 175 such as by riveting and is designed to engage the upper surface of the channel like armature 13 to apply downward pressure on the same. Lever 175 is designed to be moved by an auxiliary set point adjustment mechanism located in an aperture 180 in the base. Positioned in the recess or aperture 180 is a diaphragm 182 the outer periphery of which rests on a shoulder portion 183 of the recess 180 and is held in position by means of a clamping ring 185 which is secured in the base by a suitable means such as crimping. The supporting ring 185 carries a guide plug 190 threaded therein with an aperture therethrough through which extends a shaft 191 attached to a cup shaped member 192 positioned on the upper surface of the diaphragm. The cup shaped member and the guide plug 190 position the extremities of a biasing spring 195 which encircles the shaft 191 and urges the cup shaped member 192 against the diaphragm toward the lower portion of the recess 180. The recess 180 is connected to the inlet line or tube 55 of the thermostat by means of a passage 196 as indicated in Figure 7. Shaft 191 is connected to the pivoted member 175 through a flexible spring 197 which is attached to the lever 175 by means of an adjusting nut 198. Slots in the spring 197 and lever 175 as indicated at 200 allow for adjustment of the spring 197 relative to the lever and determine the application of the force from the auxiliary controller to the lever to adjust the same. Thus it will be seen that the action of the spring 195 acting against the force created by the pressure on the lower side of the diaphragm 182 will allow for displacement of the piston like member 192 within the recess and by virtue of its connection through the spring 197 to the lever 175 will vary the application of force from this motive device to the armature 13.

With the present arrangement as described above, the chamber 180 is connected to the main line pressure and the apparatus is designed to operate as a day-night adjustment, being remotely controlled from an increase in main line pressure, which will cause the diaphragm 182 to be displaced applying a force to the spring 197 and a flexible or spring member 175 to apply an additional force to the armature 13 and hence adds additional bias to the same.

In the event that this portion of the control apparatus is desired to be used for other than day-night adjustment, the passage way 196 to the main line tube 55 would be plugged and the plugged aperture indicated at 201 in the base of the thermostat leading to the chamber 180 would be opened to allow a new control pressure to be connected thereto such that the diaphragm would move against the spring 195 in response to the new control pressure and operate with a resultant force through the springs 197 and 175 to adjust the bias on the armature 13 of the thermostat. Adjustment of the spring 197 through the nut and bolt assembly 198 relative to the lever 175 will vary the ratio or adjust the ratio of this force to any desired setting.

Positioned over the thermostat is the cover element 210 comprised of a spherically shaped ring member 211 and a cylindrically shaped member 212 having grid like openings around the peripheral surface as indicated at 213. The members 211 and 212 are suitably connected together such as by welding and the member 212 fits down over the base portion with slots in the sides thereof such as to be retained on the base member by means of screws indicated at 215. An aperture in the spherically shaped portion 211 fits around the adjusting mechanism or handle 150 and the curvature of the spherically shaped member 211 is carried through on the curvature of the cover 161 to present a generally uniformly curved surface on the exposed face of the thermostat. The vented grid sides 213 of the cover portion 212 allows for circulation of air past the thermostat element 11 such that it responds to room temperature. Included in the base 10 are a pair of apertures indicated at 220 through which screw means may be inserted to secure the thermostat to any desired object.

In considering this invention it should be remembered that the present disclosure is intended to be illustrative only and the scope of the invention should be determined only by the appended claims.

I claim as my invention:

1. In a pneumatic thermostat, a base plate, a U-shaped bimetal attached at one extremity to said base plate, an elongated armature member attached to the opposite extremity of said bimetal and extending in substantial parallelism with said base plate, a first passage through said base plate including a restriction therein and terminating in a nozzle on the upper surface of said base plate adjacent the free extremity of said armature for a cooperation therebetween, an aperture extending through said base member, a first diaphragm positioned on the upper surface of said aperture, a cover plate secured over said diaphragm and defined with said diaphragm a first variable chamber, conduit means connecting said first passage to said first chamber, a second diaphragm positioned in said aperture and defining with said first diaphragm a second variable chamber, valve means included in said first and second diaphragms and operated by relative movement of said diaphragms, a second passage connecting said second variable chamber to the atmosphere, second valve means including a valve plunger positioned in said aperture and cooperating with a portion of said base and a portion of said valve means of said second diaphragm to define a third variable chamber and a passage between said third and second chambers, bias means urging said plunger into engagement with said portion of said base, a third passage connecting a main air supply inlet for said thermostat to said aperture remote from said second and third chambers and to said first named passage, a recess in said base plate and a bellows positioned therein forming a fourth variable chamber and having a force transmitting member positioned in said bellows and cooperating with said armature to apply a force thereto, a passage connecting said fourth variable chamber to said third variable chamber and to an outlet passage for said thermostat, and biasing means mounted on the base of said thermostat and connected to said armature to adjust the set point of said thermostat.

2. In a pneumatic thermostat, a base plate, a U-shaped bimetal attached at one extremity to said base plate, an elongated armature member attached to the opposite extremity of said bimetal and extending in substantial parallelism with said base plate, a first passage through said base plate including a restriction therein and terminating in a nozzle on the upper surface of said base plate adjacent the free extremity of said armature for cooperation therebetween, an aperture extending through said base member, a first diaphragm positioned on the upper surface of said aperture, a cover plate secured over said diaphragm and defining with said diaphragm a first variable chamber, conduit means connecting said first passage to said first chamber, a second diaphragm positioned in said aperture and defining with said first diaphragm a second variable chamber, valve means included in said first and second diaphragms and operated by relative movement of said diaphragms, a second passage connecting said second variable chamber to the atmosphere, second valve means including a valve plunger positioned in said aperture and cooperating with a portion of said base and a portion of said valve means of said second diaphragm to define a third variable chamber and a passage between said third and said second chambers, bias means urging said plunger into engagement with said portion of said base, a third passage connecting a main air supply inlet for said thermostat to said aperture remote from said second and third chambers and to said first named passage, a recess in said base plate and a bellows positioned therein forming a fourth variable chamber and having a force transmitting member positioned in said bellows and cooperating with said armature to apply a force thereto, a passage connecting said fourth variable chamber to said third variable chamber and an outlet passage for said thermostat, biasing means connecting said force transmitting member from said bellows to said armature, and adjustable biasing means mounted on said base plate and connected to said armature to adjust the set point of said thermostat.

3. In a pneumatic thermostat, a base plate, a U-shaped bimetal attached at one extremity to said base plate, an elongated armature member attached to the opposite extremity of said bimetal and extending in substantial parallelism with said base plate, a first passage through said base plate including a restriction therein and terminating in a nozzle on the upper surface of said base plate adjacent the free extremity of said armature for a cooperation therebetween, an aperture extending through said base member, a first diaphragm positioned on the upper surface of said aperture, a cover plate secured over said diaphragm and defining with said diaphragm a first variable chamber, conduit means connecting said first passage to said first chamber, a second diaphragm positioned in said aperture and defining with said first diaphragm a second variable chamber, valve means included in said first and second diaphragms and operated by relative movement of said diaphragms, a second passage connecting said second variable chamber to the atmosphere, second valve means including a valve plunger positioned in said aperture cooperating with a portion of said base and a portion of said valve means of said second diaphragm to define a third variable chamber and a passage between said third and said second chambers, bias means urging said plunger into engagement with said portion of said base, a third passage connecting a main air supply inlet for said thermostat to said aperture remote from said second and third chambers and to said first named passage, a recess in said base plate and a bellows positioned therein forming a fourth variable chamber and having a force transmitting member positioned in said bellows and cooperating with said armature to apply a force thereto, a passage connecting said fourth variable chamber to said third variable chamber and to an outlet passage for said thermostat, adjustable biasing means positioned between said force transmitting member of said bellows and said armature to adjust the amount of force feedback on said armature, and adjustable biasing means mounted on said base plate and connected to said armature to adjust the set point of said thermostat.

4. In a pneumatic thermostat, a base plate, a U-shaped bimetal attached at one extremity to said base plate, an elongated armature member attached to the opposite extremity of said bimetal and extending in substantial parallelism with said base plate, a first passage through said base plate including a restriction therein and terminating in a nozzle on the upper surface of said base plate adjacent the free extremity of said armature for cooperation therebetween, an aperture extending through said base member, a first diaphragm positioned on the upper surface of said aperture, a cover plate secured over said diaphragm and defining with said diaphragm a first variable chamber, conduit means connecting said first passage to said first chamber, a second diaphragm positioned in said aperture and defining with said first diaphragm a second variable chamber, valve means included in said first and second diaphragms and operated upon relative movement of said diaphragms, a second passage connecting said second variable chamber to the atmosphere, second valve means including a valve plunger positioned in said aperture and cooperating with a portion of said base and a portion of said valve means of said second diaphragm to define a third variable chamber and a passage between said third and said second chambers, bias means urging said plunger into engagement with said portion of said base, a third passage connecting a main air supply inlet for said thermostat to said aperture remote from said second and third chambers and to said first named passage, a recess in said base plate and a bellows positioned therein forming a fourth variable chamber and having a force transmitting member positioned in said bellows and cooperating with said armature to apply a force thereto, a passage connecting said fourth variable chamber to said third variable chamber and to an outlet passage for said thermostat, adjustable biasing means mounted on said armature and cooperating with said force transmitting member of said bellows to vary the amount of force feedback on said armature, and adjustable biasing means mounted on said base plate and connected to said armature to adjust the set point of said thermostat.

5. In a pneumatic thermostat, a base plate, a U-shaped bimetal attached at one extremity to said base plate thereof, an elongated armature member attached to the opposite extremity of said bimetal and extending in substantial parallelism with said base plate, a first passage through said base plate including a restriction therein and terminating in a nozzle on the upper surface of said base plate adjacent the free extremity of said armature for cooperation therebetween, said nozzle being formed of a plate having a raised protrusion with an aperture therein and attached to said base plate, an aperture extending through said base member, a first diaphragm positioned on the upper surface of said aperture, a cover plate secured over said diaphragm and defining with said diaphragm a first variable chamber, conduit means connecting said first passage to said first chamber, a second diaphragm positioned in said aperture and defining with said first diaphragm a second variable chamber, valve means included in said first and second diaphragms and operated by relative movement of said diaphragms, a second passage connecting said second variable chamber to the atmosphere, a second valve means including a valve plunger positioned in said aperture and cooperating with a portion of said base and a portion of said valve means of said second diaphragm to define a third variable chamber and a passage between said third and said second chambers, bias means urging said plunger into engagement with said portion of said base, a third passage connecting a main air supply inlet for said thermostat to said aperture remote from said second and third chambers and to said first named passage, a recess in said base plate in the bellows positioned therein forming a fourth variable chamber and having a force transmitting member positioned in said bellows and cooperating with said armature to apply a force thereto, a passage connecting said fourth variable chamber to said third variable chamber and to an outlet passage for said thermostat, and biasing means mounted on the base of said thermostat and connected to said armature to adjust the set point of said thermostat.

6. In a pneumatic thermostat, a base plate, a U-shaped bimetal attached at one extremity to said base plate, an elongated armature member attached to the opposite extremity of said bimetal and extending in substantial parallelism with said base plate, a first passage through said base plate including a restriction therein and terminating in a nozzle on the upper surface of said base plate adjacent the free extremity of said armature for cooperation therebetween, an aperture extending through said base member, a first diaphragm positioned on the upper surface of said aperture, a cover plate secured over said diaphragm and defining with said diaphragm a first variable chamber, conduit means connecting said first passage to said first chamber, a second diaphragm in said aperture and defining with said first diaphragm a second variable chamber, valve means included in said first and second diaphragms and operated by relative movement of said diaphragms, a second passage connecting said second variable chamber to the atmosphere, second valve means including a valve plunger positioned in said aperture and cooperating with a portion of said base and a portion of said second diaphragm to define a third variable chamber and a passage between said valve means of said second chamber, bias means urging said plunger into engagement with said portion of said base, a third passage connecting a main air supply inlet for said thermostat to said aperture remote from said second and third chambers and to said first named passage, a recess in said base plate in the bellows positioned therein forming a fourth variable chamber and having a force transmitting member positioned in said bellows and cooperating with said armature to apply a force thereto, a passage connecting said fourth variable chamber to said third variable chamber and to an outlet passage for said thermostat, and biasing means mounted on the base of said thermostat and connected to said armature to adjust the set point of said thermostat, the bimetal normally urging said armature toward said nozzle on a rise in temperature above the set point of the thermostat to increase pressure in said first variable chamber and displace the valve plunger allowing supply air to enter the third and fourth variable chambers, the increase in pressure in the fourth variable chamber operating to move said force transmitting mechanism to apply a restoring force to said armature.

7. In a pneumatic thermostat, a base plate, a U-shaped bimetal attached at one extremity to said base plate thereof, an elongated armature member attached to the opposite extremity of said bimetal and extending in substantial parallelism with said base plate, a first passage through said base including a restriction therein and terminating in a nozzle on the upper surface of said base plate adjacent the free extremity of said armature for a cooperation therebetween, an aperture extending through said base member, a first diaphragm positioned on the upper surface of said aperture, a cover plate secured over said diaphragm and defining with said diaphragm a first variable chamber, conduit means connecting said first passage to said first chamber, a second diaphragm in said aperture and defining with said first diaphragm a second variable chamber, a valve means included in said first and second diaphragms and operated by relative movement of said diaphragms, a second passage connecting said second variable chamber to the atmosphere, second valve means including a valve plunger positioned in said aperture and cooperating with a portion of said base and a portion of said second diaphragm to define a third variable chamber and a passage between said valve means of said second chamber, bias means urging said plunger into engagement with said portion of said base, a third passage connecting a main air supply for said thermostat to said aperture remote from said second and third chambers and to said first named passage, a recess in said base plate in the bellows positioned therein forming a fourth variable chamber and having a force transmitting member positioned in said bellows and cooperating with said armature to apply a force thereto, a passage connecting said fourth variable chamber to said third variable chamber and to an outlet passage for said thermostat, biasing means mounted on the base of said thermostat and connected to said armature to adjust the set point of said thermostat, night set back means including a variable chamber in said base plate and a force transmitting mechanism associated therewith, means connecting said force transmitting means with said armature and operating upon a change of supply of air pressure to variably bias on said armature to reset the set point of said armature.

8. A pneumatic thermostat comprising, a base member, a bimetal mounted on said base member, an armature attached to said bimetal and adapted to be pivoted thereby in response to temperature variations of the bimetal, a source of supply air, a passage with a restriction therein positioned in said base and connected to said air supply and terminating in a nozzle positioned in cooperative relationship with said armature, a pneumatic pilot relay connected to said first named passage and controlled by the pressure in said passage, a main relay positioned in cooperative relationship with said pilot relay for operation thereby, said main relay including a second passageway therethrough to the outlet of the thermostat from the air supply and a third passage connected to said second named passage and an atmospheric vent, said main relay being controlled by said pilot relay to open and close said second and third passages therethrough in alternate positions of operation of said main relay, a force feedback means connected to said second passage of said main relay and providing a force output in proportion to the outlet pressure of the thermostat, means connecting said force feedback means to said armature to apply a restoring force to said armature, and biasing means connected between said armature and said base member and acting against the force of said bimetal upon a rise in temperature to establish a set point for said thermostat.

9. A pneumatic thermostat comprising, a base member, a bimetal mounted on said base member, an armature attached to said bimetal and adapted to be pivoted thereby in response to temperature variations of the bimetal, a source of supply air, a passage with a restriction therein positioned in said base, and connected to said air supply and terminating in a nozzle positioned in cooperative relationship with said armature, a pneumatic pilot relay connected to said first named passage and controlled by the pressure in said passage, a main relay positioned in cooperative relationship with said pilot relay for operation thereby, said main relay including a second passageway therethrough to the outlet of the thermostat from the air supply and a third passage connected to said second named passage and an atmospheric vent, said main relay being controlled by said pilot relay to open and close said second and third passages therethrough in alternate positions of operation of said main relay, a force feedback means connected to said second passage of said main relay and providing a force output in proportion to the outlet pressure of the thermostat, and flexible means on said armature cooperating with said force feedback means to apply the force from said force feedback means to said armature and effect a restoring force on said armature, and adjustable biasing means connected between said armature and said base member urging said armature from said nozzle.

10. A pneumatic thermostat comprising, a base member, a bimetal mounted on said base member, an armature attached to said bimetal and adapted to be pivoted thereby in response to temperature variations of the bimetal, a source of supply air, a passage with a restriction therein positioned in said base and connected to said air supply and terminating in a nozzle positioned in cooperative relationship with said armature, a pneumatic pilot relay connected to said first named passage and controlled by the pressure in said passage, a main relay positioned in cooperative relationship with said pilot relay for operation thereby, said main relay including a second passageway therethrough to the outlet of the thermostat from the air supply and a third passage connected to said second named passage and an atmospheric vent, said main relay being controlled by said pilot relay to open and close said second and third passages therethrough in alternate positions of operation of said main relay, a force feedback means connected to said second passage of said main relay and providing a force output in proportion to the outlet pressure of the thermostat, and adjustably positioned flexible means on said armature cooperating with said force feedback means to apply a force therefrom to said armature and effect a restoring force to said armature, and adjustable biasing means connected between said armature and said base member to establish a set point for said thermostat.

11. A pneumatic thermostat comprising, a base member, a bimetal mounted on said base member, an armature attached to said bimetal and adapted to be pivoted thereby in response to temperature variations of the bimetal, a source of supply air, a passage with a restriction therein positioned in said base and connected to said air supply and terminating in a nozzle positioned in cooperative relationship with said armature, a pneumatic pilot relay connected to said first named passage and controlled by the pressure in said passage, a main relay positioned in cooperative relationship with said pilot relay for operation thereby, said main relay including a second passageway therethrough to the outlet of the thermostat from the air supply and a third passage connected to said second named passage and an atmospheric vent, said main relay being controlled by said pilot relay to open and close said second and third passages therethrough in alternate positions of operation of said main relay, a force feedback means connected to said second passage of said main relay and providing a force output in proportion to the outlet pressure of the thermostat, means connecting said force feedback means to said armature to apply a restoring force to said armature, biasing means connected between said armature and said base member and acting against the force of said bimetal upon a rise in temperature to establish a set point for said thermostat, and night set back means responsive to the pressure of the air supply and connected to said armature to alter the spring bias thereon.

12. A pneumatic thermostat comprising, a base member, a bimetal mounted on said base member, an armature attached to said bimetal and adapted to be pivoted thereby in response to temperature variations of the bimetal, a source of supply air, a passage with a restriction therein positioned in said base and connected to said air supply and terminating in a nozzle positioned in cooperative relationship with said armature, said nozzle being formed of a plate having a projection with an aperture therein positioned on said base plate and secured thereto, a pneumatic pilot relay connected to said first named passage and controlled by the pressure in said passage, a main relay positioned in cooperative relationship with said pilot relay for operation thereby, said main relay including a second passageway therethrough to the outlet of the thermostat from the air supply and a third passage connected to said second named passage and an atmospheric vent, said main relay being controlled by said pilot relay to open and close said second and third passages therethrough in alternate positions of operation of said main relay, a force feedback means connected to said second passage of said main relay and providing a force output in proportion to the outlet pressure of the thermostat, means connecting said force feedback means to said armature to apply a restoring force to said armature, and biasing means connected between said armature and said base member and acting against the force of said bimetal upon a rise in temperature to establish a set point for said thermostat.

13. A pneumatic thermostat comprising, a cylindrically shaped base member, a U-shaped bimetal secured at one extremity to said base member and mounting a flapper at the other extremity, a bleed nozzle mounted on said base in proximity with said flapper for control thereby, a relay connected to and controlled by said bleed nozzle, means for connecting said bleed nozzle and said relay to a source of air pressure, output connection means from said thermostat adapted to have a controlled output pressure therein, motive means connected to said output connection means and controlled by said output pressure, means connecting said motive means to said flapper to provide a force balance on said flapper, an adjustable bias means connected to said flapper to adjust the operating point of the thermostat.

14. A pneumatic thermostat comprising, a cylindrically shaped base member, a U-shaped bimetal secured at one extremity to said base member and mounting a flapper at the other extremity, a bleed nozzle mounted on said base in proximity with said flapper for control thereby, a relay connected to and controlled by said bleed nozzle, means for connecting said bleed nozzle and said relay to a source of air pressure, output connection means from said thermostat adapted to have a controlled output pressure therein, motive means connected to said output connection means and controlled by said output pressure, means connecting said motive means to said flapper to provide a force balance on said flapper, an adjustable bias means connected to said flapper to adjust the operating point of the thermostat, an auxiliary motive means connected to a source of signal pressure and controlled thereby, means connecting said auxiliary motive means through a spring means to said flapper to adjust the spring bias on said flapper.

15. A pneumatic thermostat comprising, a cylindrically shaped base member, a U-shaped bimetal secured at one extremity to said base member and mounting a flapper at the other extremity, a bleed nozzle mounted on said base in proximity with said flapper for control thereby, a relay connected to and controlled by said bleed nozzle, means for connecting said bleed nozzle and said relay to a source of air pressure, output connecting means from said thermostat adapted to have a controlled output pressure therein, motive means connected to said output connection means and controlled by said output pressure, means connecting said motive means to said flapper to provide a force balance on said flapper, an adjustable bias means connected to said flapper to adjust the operating point of the thermostat, an auxiliary motive means connected to a source of signal pressure and controlled thereby, means connecting said auxiliary motive means through a spring means to said flapper to adjust the spring bias on said flapper, and valve means connected to said output connection means and including a deformable rubber plug with a normally closed aperture therethrough adapted to be opened by deformation of said plug to expand said aperture.

16. A pneumatic thermostat comprising, a cylindrically shaped base member, a U-shaped bimetal secured at one extremity to said base member and mounting a flapper at the other extremity, a bleed nozzle mounted on said base in proximity with said flapper for control thereby, said nozzle including a plate having a raised portion with an aperture at the raised extremity thereof and a restriction therein and means for securing said plate to said base with the raised portion exposed and with a passageway from said restriction to the unexposed surface of said raised portion, a relay connected to and controlled by said bleed nozzle, means for connecting said bleed nozzle and said relay to a source of air pressure, output connection means from said thermostat adapted to have a controlled output pressure therein, motive means connected to said output connection means and controlled by said output pressure, means connecting said motive means to said flapper to provide a force balance on said flapper, an adjustable bias means connected to said flapper to adjust the operating point of the thermostat.

References Cited in the file of this patent

UNITED STATES PATENTS

| | | |
|---|---|---|
| 1,897,857 | Otto | Feb. 14, 1933 |
| 2,213,446 | McGrath | Sept. 3, 1940 |
| 2,287,045 | Lilja | June 23, 1942 |
| 2,295,804 | Olson | Sept. 15, 1942 |
| 2,326,226 | Joesting | Aug. 10, 1943 |
| 2,618,978 | Ragland | Nov. 25, 1952 |

OTHER REFERENCES

Heinz, article entitled "Comparisons of Force-Balance and Position-Balance Control Mechanisms." Pages 456–460, inclusive, of Instruments, magazine, July 1945.